United States Patent [19]

Fujita et al.

[11] 4,351,765

[45] Sep. 28, 1982

[54] PROCESS FOR THE PRODUCTION OF COMPOUNDS HAVING IN THE MOLECULE AT LEAST ONE β-SULFATOETHYL-SULFONE GROUP AND AT LEAST ONE SULFONIC ACID GROUP

[75] Inventors: Taira Fujita, Nishinomiya; Hiroyuki Nakagawa, Kawanishi; Mikio Sugihara, Takatsuki; Kimiyuki Kobayashi, Minoo; Katuhiko Okamoto, Kyoto, all of Japan

[73] Assignee: Sumitomo Chemical Company, Limited, Osaka, Japan

[21] Appl. No.: 116,623

[22] Filed: Jan. 29, 1980

[30] Foreign Application Priority Data

Feb. 13, 1979 [JP] Japan .................................. 54/15791

[51] Int. Cl.$^3$ ................ C07C 139/00; C07C 139/100; C07C 141/04; C07C 141/14
[52] U.S. Cl. .................................... 260/163; 260/144; 260/147; 260/157; 260/158; 260/162; 260/198; 260/199; 260/200; 260/206; 260/207; 260/208; 260/314.5; 260/372; 260/374; 260/458 R; 260/458 F
[58] Field of Search .................. 260/458 C, 147, 162, 260/163, 157, 158, 198, 199, 200, 207, 206, 144, 208, 372, 314.5, 458 R, 458 F, 374

[56] References Cited

U.S. PATENT DOCUMENTS

| | | | |
|---|---|---|---|
| 1,981,901 | 11/1934 | Bunbury et al. | 260/458 R |
| 2,060,254 | 11/1936 | Siebenburger | 260/459 R |
| 2,092,075 | 9/1937 | Knight | 260/458 C X |
| 2,150,557 | 3/1939 | MacMullen | 260/458 C |
| 2,384,734 | 9/1945 | Felix et al. | 260/450 C X |
| 2,708,675 | 5/1955 | Slagh | 260/458 C |
| 3,135,730 | 6/1965 | Heyna et al. | 260/147 |
| 3,372,170 | 3/1968 | Remy | 260/372 |
| 3,380,989 | 4/1968 | Remy | 260/186 X |
| 3,384,843 | 5/1968 | Remy | 260/163 |
| 3,406,163 | 10/1968 | Meininger et al. | 260/162 |
| 3,414,579 | 12/1968 | Remy | 260/162 X |
| 3,859,271 | 1/1975 | Sugiyama et al. | 260/163 |

FOREIGN PATENT DOCUMENTS 1268756  5/1968  Fed. Rep. of Germany ...... 260/374

Primary Examiner—Floyd D. Higel
Attorney, Agent, or Firm—Stevens, Davis, Miller & Mosher

[57] ABSTRACT

A compound having at least one —$SO_2CH_2CH_2OSO_3M$ group in the molecule, wherein M is hydrogen or an alkali metal, which is useful as a reactive dye for dying cellulose fiber materials or as an intermediate for production of said reactive dye, is industrially advantageously produced in a high yield and a high quality by esterification of a compound having at least one —$SO_2CH_2CH_2OH$ in the molecule using a sulfuric acid-esterifying agent in the presence of a water-insoluble organic solvent and a secondary or tertiary amine.

11 Claims, No Drawings

PROCESS FOR THE PRODUCTION OF COMPOUNDS HAVING IN THE MOLECULE AT LEAST ONE β-SULFATOETHYL-SULFONE GROUP AND AT LEAST ONE SULFONIC ACID GROUP

The present invention relates to an improved process for production of sulfuric acid semiesters. More particularly, it relates to a process for producing a compound having β-sulfatoethylsulfone group(s) in the molecule, which is useful, for example, as a reactive dye for dyeing cellulose fiber materials, or as an intermediate for production of said reactive dye.

It is well known that compounds having β-sulfatoethylsulfone group(s) in the molecule have been manufactured by esterification of compounds having β-hydroxyethylsulfone group(s) in one molecule, and widely used as reactive dyes for dyeing cellulose fiber materials or as intermediates for production of said reactive dyes.

In conventional esterification, however, a large excess of sulfuric acid or chlorosulfuric acid is required, so that after completion of the esterification, troublesome neutralization and subsequent after-treatments are inevitably required and besides large quantities of inorganic salts are by-produced to contaminate the final products. Therefore it is very difficult to obtain high-purity products.

Further, another drawback of the conventional esterification is that said neutralization must be carried out very carefully and slowly, because, when the alkali concentration in the neutralization is locally too high or heating is locally too strong, the once produced β-sulfatoethylsulfone group decomposes into a vinylsulfone group and sulfuric acid, or it is resaponified to a β-hydroxyethylsulfone group.

Methods for overcoming these problems are disclosed in U.S. Pat. No. 3,372,170, wherein sulfuric acid semiesters are produced in a water-soluble organic solvent such as pyridine or picoline using amidosulfonic acid in an amount of 3 to 4 moles per β-hydroxyethylsulfone group of the compound to be esterified. These methods are superior in that the amount of esterifying agent is smaller than that in a conventional method. While, the isolation of objective compounds from the water-soluble organic solvent is very troublesome, as described in the examples of said U.S. Patent i.e. after completion of the reaction, the reaction mixture is poured into a large quantity of water, and the produced sulfuric acid semiester is salted out with potassium chloride, filtered and then washed with a concentrated aqueous potassium chloride solution. Consequently, the sulfuric acid semiester is contaminated with a large quantity of salt, and the loss of the sulfuric acid semiester by dissolution in waste water can not be avoided. Besides, the water-soluble organic solvent such as pyridine or picoline in the waste water should be recovered or removed by a certain method before the waste water reaches a drainage canal. Further, there is another drawback, i.e., it is difficult to make the water-soluble organic solvent such as pyridine completely water-free, so that hydrolysis of amidosulfonic acid easily occurs because the esterification is carried out at relatively high reaction temperatures, which results in that a considerable excess of esterifying agent is essential although the amount of the agent could be decreased as compared with the conventional methods.

For the reasons as described above, it is important to develop a process for producing the desired esters, which is free from the aforesaid drawbacks, can prevent sulfuric acid semiesters from being contaminated with a large quantity of salts and decrease the amount of sulfuric acid-esterifying agent, and besides needs no waste water treatment.

As a result of an extensive study, the inventors found an improved process which comprises carrying out the esterification in a water-insoluble organic solvent in the presence of a secondary or tertiary amine and a sulfuric acid-esterifying agent, whereby the high-purity objective esters can be produced in almost quantitative yields and without producing waste water causing environmental pollution, using relatively small amounts of the esterifying agent.

The present invention provides a process for producing a compound having at least one β-sulfatoethylsulfone group of the formula $-SO_2CH_2CH_2OSO_3M$, wherein M is hydrogen or an alkali metal, in the molecule, which comprises reacting a starting compound having at least one β-hydroxyethylsulfone group of the formula, $-SO_2CH_2CH_2OH$, in the molecule, with an esterifying agent in the presence of a water-soluble organic solvent and a secondary or tertiary amine.

The compound having β-hydroxyethylsulfone group(s) in the molecule (hereinafter referred to as starting compound), which is subjected to esterification in accordance with the present invention includes organic dye compounds and their intermediates. There are exemplified, for example, azo-series compounds including 1-hydroxy-2-(4-β-hydroxyethylsulfonyl)-phenylazo-naphthalene-3-sulfonic acid, 1-hydroxy-2-[2'-methoxy-4'-(3''-β-hydroxyethylsulfonyl)phenylazo-5'-methyl]phenylazonaphthalene-3,6,8-trisulfonic acid and the like, anthraquinone-series compounds including 1-amino-4-(3-β-hydroxyethylsulfonyl)anilino-anthraquinone-2-sulfonic acid and the like, naphthalene-series compounds including 1-amino-2,7-bis[4-(β-hydroxyethylsulfonyl)phenylazo]-8-hydroxynaphthalene-3,6-disulfonic acid and the like, pyrazolone-series compounds including 1-(4-β-hydroxyethylsulfonyl)-phenyl-3-methyl-4-(2-sulfo-4-chloro)phenylazo-5-pyrazolone and the like, phthalocyanine-series compounds and the like, and their intermediates. In the process of the present invention, the anthraquinone-series dye compounds or their intermediates are particularly advantageously esterified.

The water-insoluble organic solvent used in the present invention includes those which are capable of dissolving a secondary or tertiary amine and are inactive to the esterification. For example, there may be conventional aromatic hydrocarbons having a liquid form at room temperature (e.g. benzene, toluene, xylene, ethylbenzene, cumene, mesitylene, butylbenzene, nitrobenzene, chlorobenzene, dichlorobenzene, styrene, tetrahydronaphthalene), and aliphatic hydrocarbons (e.g. saturated hydrocarbons including cyclohexane, heptane, methylcyclohexane, ethylcyclohexane, octane, trimethylpentane, nonane, decane, decaline, dichloroethane, trichloroethane, tetrachloroethane, and unsaturated hydrocarbons including heptene, octene, nonene, cyclohexene, trichloroethylene, tetrachloroethylene), and mixtures thereof. The amount of the solvent is not particularly limited and can be determined so as to make the reaction progress smoothly.

The esterifying agent used in the present invention includes sulfuric acid, sulfamic acid, chlorosulfonic acid and the like, and these agents may be used in combination. The amount of the agent used may be of the theoretical amount or more. The excess amount thereof can be used with no adverse effect on the reaction itself. For industrial purposes, however, the preferred amount is 1 to 10 moles per β-hydroxyethylsulfone group of the starting compound.

The secondary or tertiary amine is used to make the esterifying agent and the starting compound having at least one sulfonic acid group soluble in the water-insoluble organic solvent and besides accelerate the esterification. There are exemplified amines of the following formula (I):

wherein $R_1$ is a $C_6$–$C_{24}$ aliphatic, aromatic or aralkyl group, and $R_2$ and $R_3$ are independently a hydrogen atom or a $C_1$–$C_{24}$ hydrocarbon group, provided that $R_2$ and $R_3$ are not a hydrogen atom at the same time.

Examples of the secondary amines include diheptylamine, dioctylamine, didecylamine, didodecylamine, ditetradecylamine, dihexadecylamine, dioctadecylamine, dibenzylamine, di-α-methylbenzylamine, di-2-ethylhexylamine, bis-(2-methylcyclohexylmethyl)amine, N-methyldodecylamine, N-(2-ethylhexyl)-2-pentylnonylamine, N-benzyldodecylamine, N-benzylteradecylamine, N-α-methylbenzyl-2-ethylhexylamine, N-3-phenylpropyl-n-tetradecylamine, N-methyltetradecylamine and N-methyloctadecylamine.

Examples of the tertiary amines include trihexylamine, trioctylamine, tridecylamine, tridodecylamine, N-methyldioctylamine, N-methyldidecylamine, N-methyldidodecylamine, N-methyldioctadecylamine, N-methyldiethylhexylamine, N-dodecyldimethylamine, N-dodecyldiethylamine, N-dodecyldibutylamine, N-dodecyldihexylamine, N-dodecyldibenzylamine (dibenzyldodecylamine), N-benzyldidodecylamine, N-propyldidecylamine, N-butyldidodecylamine, N-tetradecyldibenzylamine, N-isooctyldibenzylamine, di(methylbenzyl)dodecylamine, dibenzyloctadecylamine, dibenzyloctylamine and dibenzyldecylamine.

Of these, the preferred amines are dibenzylamine, didodecylamine, dioctadecylamine, di-α-methylbenzylamine, N-benzyldodecylamine, trioctylamine, tridodecylamine, di-benzyldodecylamine, benzyldidodecylamine, dibenzyloctadecylamine and dibenzyldecylamine, and the more preferred amines are trioctylamine, tridodecylamine and dibenzyldodecylamine.

The amount of the amine to be used is determined depending on the numbers of sulfonic acid group(s) if any, and β-hydroxyethylsulfone group(s) of the starting compound, and is usually from 1 to 10 moles per mole of the starting compound.

The reaction temperature varies depending on the kinds of the starting compound and the esterifying agent, and is usually from about 40° C. to about 180° C.

The process of present invention is explained in more detail as follows.

(1) A case where the starting compound is soluble in the organic solvents (i) The starting compound, the amine in an amount of 1 to 2 moles, preferably 1.0 to 1.5 moles, per β-hydroxyethylsulfone group of the starting compound and the esterifying agent, preferably sulfamic acid in an amount of 2 to 3 moles, preferably 2.0 to 2.2 moles per β-hydroxyethylsulfone group of the starting compound are added to the water-insoluble organic solvent, and the mixture is heated with vigorous stirring to 60° to 180° C., preferably 90° to 140° C. for 1 to 10 hours to obtain the desired sulfuric acid semiester.

(ii) The amine in an amount of 1 to 3 moles, preferably 1.0 to 2.0 moles and the esterifying agent, preferably sulfuric acid in an amount of 1 to 2 moles, preferably 1.0 to 1.5 moles, per β-hydroxyethylsulfone group of the starting compound are added to a heterogeneous solution of water and the water-insoluble organic solvent, and the mixture is heated to 40° to 95° C. for 0.5 to 3 hours with stirring and allowed to stand to separate it into two layers. To the separated organic layer is added 1 mole of the starting compound, and the mixture is heated to 60° to 180° C., preferably 90° to 140° C. for 1 to 10 hours with stirring, while azeotropically removing residual water and water produced as by-product. Thus, the desired sulfuric acid semiester is obtained.

(2) A case where the starting compound has sulfonic acid group(s)

(i) The starting compound in an amount of 1 mole, the amine in an amount of 2 to 10 moles, preferably 2 to 5 moles and sulfuric acid in an amount of 0 to 2.0 moles are added to a heterogeneous solution of water and the water-insoluble organic solvent, and the mixture is heated to 40° to 95° C. for 0.5 to 3 hours with vigorous stirring and allowed to stand to separate it into two layers. The separated organic layer is made completely water-free by azeotropic dehydration, and the esterifying agent, preferably sulfamic acid in an amount of 1 to 3 mole per β-hydroxyethylsulfone group of the starting compound is added thereto. The mixture is then heated to 60° to 180° C., preferably 90° to 145° C. for 0.5 to 5 hours with vigorous stirring to obtain the desired sulfuric acid semiester.

(ii) The starting compound in an amount of 1 mole, the amine in an amount of 2 to 10 moles, preferably 2 to 5 moles and the esterifying agent, preferably sulfuric acid in an amount of 1 to 10 moles per β-hydroxyethylsulfone group of the starting compound are added to heterogeneous solution of water and the water-insoluble organic solvent, and the mixture is heated to 40° to 95° C. for 0.5 to 3 hours with vigorous stirring and allowed to stand to separate it into two layers. The separated organic layer is azeotropically dehydrated at 90° to 150° C. to obtain the desired sulfuric acid semiester.

(iii) The starting compound, in the amine in an amount of 1 to 1.5 moles and sulfuric acid in an amount of 0 to 1.0 mole, per sulfonic acid group of the starting compound are added to a heterogeneous solution of water and the water-insoluble organic solvent, and the mixture is heated to 40° to 95° C. for 0.5 to 2 hours with stirring and allowed to stand to separate it into two layers. The separated upper layer is made water-free by azeotropic dehydration, and the amine in an amount of 1 to 3 moles and the esterifying agent, preferably sulfamic acid in an amount of 2 to 6 moles per β-hydroxyethylsulfone group of the starting compound are added thereto. The mixture is then heated to 60° to 180° C., preferably 90° to 145° C. for 0.5 to 5 hours with vigorous stirring to obtain the desired sulfuric acid semiester.

Next, the produced sulfuric acid semiester in the organic layer can be isolated, for example, by the following method.

When an excess of the acid is present in the organic layer, it is removed by extraction with water or a small amount of weakly alkaline aqueous solution, and then the sulfuric acid semiester is extracted from the organic layer with a weakly alkaline aqueous solution. This weakly alkaline aqueous solution is preferably prepared using sodium hydrogen carbonate or sodium carbonate. The aqueous solution containing the sulfuric acid semiester is neutral or weakly acidic. This solution is then subjected to evaporation to dryness or spray-drying, thereby to obtain the desired compound having $\beta$-sulfatoethylsulfone group(s) as a sodium salt. In the methods described above, alkalis such as potassium hydrogen carbonate, potassium carbonate, lithium hydrogen carbonate and lithium carbonate may be used in place of the sodium compounds to obtain a potassium or lithium salt of the desired ester compound.

The sulfuric acid semiesters thus obtained are high-purity products containing substantially no free inorganic salts.

By the esterification of the present invention, the desired ester compounds can be obtained with an esterification rate of 95 to 100% and in a quantitative high yield, and besides the quality of the compounds is higher than in the conventional methods. Also, the organic layer separated by the extraction, and the secondary or tertiary amine contained in the layer can be used repeatedly. Further surprisingly, even though the starting compounds contain other compounds as impurities, the corresponding sulfuric acid semiesters can be obtained in high purity by properly determining the pH on alkali extraction after completion of the reaction.

The present invention will be illustrated in more detail with reference to the following examples. All parts in the examples are by weight.

EXAMPLE 1

To a solution of dibenzyldodecylamine (50 parts) in a mixed xylene (150 parts) were added water (80 parts), conc. sulfuric acid (20 parts) and then a dye base, sodium 1-amino-4-(3-$\beta$-hydroxyethylsulfonyl)anilino-anthraquinone-2-sulfonate (26 parts), followed by vigorous stirring at 60° C. for 1 hour. The reaction mixture separated into two layers on standing, with the lower layer being colorless. The two layers were separated from each other, and the upper layer was heated to 140° C. to remove a little water and then kept at the same temperature for 3 hours. The reaction was thus completed.

After cooling to 80° C. or less, water (150 parts) was added to the reaction mixture which was then stirred at 60° C. for 1 hour and allowed to stand. An excess of the acid was removed by separating the aqueous layer from the organic layer. Thereafter, an aqueous solution of sodium hydrogen carbonate (8.4 parts) in water (150 parts) was added dropwise to the organic layer with vigorous stirring. After the addition was finished, the mixture was stirred at room temperature for 3 hours, and allowed to stand to separate it into two layers. The lower layer was colored blue and had a pH of 5.5. The lower layer was dried at 60° C. under reduced pressure to obtain 30 parts of the sodium salt of sulfuric acid semiester. The sodium sulfate content of the cake was 0.5% which was extremely smaller than in the conventional methods.

The foregoing sodium salt of sulfuric acid semiester agreed with the dye obtained by the conventional esterification with conc. sulfuric acid, and was able to dye cellulosic fibers fast in the presence of an alkali agent.

EXAMPLE 2

To a solution of dibenzyldodecylamine (40 parts) in a mixed xylene (200 parts) were added water (100 parts), conc. sulfuric acid (8 parts) and then sodium 1-amino-4-(3-$\beta$-hydroxyethylsulfonyl)anilino-anthraquinone-2-sulfonate (52 parts), followed by stirring at 60° C. for 1 hour. The reaction mixture separated into two layers on standing, with the lower layer being colorless. The two layers were separated from each other, and the upper layer was heated to 140° C. for dehydration. After cooling to 70° C., dibenzyododecylamine (40 parts) and sulfamic acid (20 parts) were added thereto, followed by heating at 100° C. for 3 hours.

After cooling to 70° C., water (200 parts) was added to the reaction mixture which was then stirred at 60° C. for 1 hour and allowed to stand to separate it into two layers. The same washing operation was repeated 2 more times. Thereafter, an aqueous solution of sodium hydrogen carbonate (16 parts) in water (300 parts) was added dropwise to the reaction mixture which was then treated in the same manner as in Example 1 to obtain 60 parts of the sodium salt of sulfuric acid semiester. The sodium sulfate content of the salt was as little as less than 0.3%.

EXAMPLE 3

A 93%-purity sodium 1-amino-4-(3-$\beta$-hydroxyethylsulfonyl)anilino-anthraquinone-2-sulfonate (28 parts) containing sodium 1-amino-4-hydroxyanthraquinone-2-sulfonate and sodium 1-aminoanthraquinone-2-sulfonate as impurities was brought, in the same manner as in Example 1, to the stage where an excess of the acid was removed.

Thereafter, an aqueous solution of sodium hydrogen carbonate (8.0 parts) in water (150 parts) was added dropwise with stirring. After the addition was finished, the reaction mixture was stirred at room temperature for 3 hours and allowed to stand to separate it into two layers. The blue colored lower layer had a pH of 4.9. The layer was dried at 60° C. under reduced pressure to obtain the sodium salt (27 parts) of sulfuric acid semiester. The ester thus obtained contained no foregoing impurities present in the starting material.

EXAMPLE 4

1-(4-$\beta$-hydroxyethylsulfonyl)-phenyl-3-methyl-5-pyrazolone (14 parts), which is an intermediate for pyrazolone dyes, sulfamic acid (10 parts) and tridodecylamine (26 parts) were added to toluene (100 parts), and the mixture was refluxed for 5 hours with vigorous stirring. After cooling to 60° C., water (100 parts) was added to the reaction mixture which was then stirred at the same temperature for 1 hour and allowed to stand to separate it into two layers. The lower layer was discarded, and a solution of sodium hydrogen carbonate (4.8 parts) in water (200 parts) was added dropwise to the other layer with stirring. After the addition was finished, the mixture was stirred at room temperature for 2 hours and allowed to stand to separate it into two layers. The separated yellow colored lower layer had a pH of 6.3. The layer was dried at 60° C. under reduced pressure to obtain the sodium salt (19 parts) of the corresponding sulfuric acid semiester. The sodium sulfate content of the salt was as little as 0.7%.

The sulfuric acid semiester thus obtained agreed with that obtained by the conventional method using conc. sulfuric acid.

EXAMPLE 5

Water (50 parts) and conc. sulfuric acid (6 parts) were added to a solution of tridodecylamine (28 parts) in toluene (100 parts), and the mixture was stirred at 60° C. for 1 hour and allowed to stand to separate it into two layers. The lower layer (aqueous layer) was discarded. 3-(β-Hydroxyethylsulfonyl)aniline (10 parts), an intermediate, was added to the upper layer, and the mixture was dehydrated azeotropically for 3 hours with stirring. Thereafter, an aqueous solution of sodium hydrogen carbonate (4.2 parts) in water (50 parts) was added dropwise thereto at room temperature. After the addition was finished, the mixture was stirred for 2 more hours and allowed to stand to separate it into two layers. The lower layer was dried at 40° C. under reduced pressure to obtain the pale brown sodium salt (12 parts) of sulfuric acid semiester. The sodium sulfate content of the sodium salt was as little as 0.3%.

EXAMPLE 6

Water (150 parts) and conc. sulfuric acid (40 parts) were added to a solution of dibenzyldodecylamine (100 parts) in a mixed xylene (300 parts), and sodium then 1-amino-2,7-bis[4-(β-hydroxyethylsulfonyl)phenylazo]-8-hydroxynaphthalene-3,6-disulfonate (39 parts) was further added thereto. The mixture was then brought, in the same manner as in Example 1, to the stage where an excess of the acid was removed.

Thereafter, a solution of sodium hydrogen carbonate (16.8 parts) in water (250 parts) was added dropwise thereto. After the addition was finished, the mixture was stirred at room temperature for 2 hours and allowed to stand to separate it into two layers. The separated lower layer was colored deep bluish black and had a pH of 5.8. This layer was dried at 60° C. under reduced pressure to obtain 49 parts of the sodium salt of the corresponding diester. The sodium sulfate content of the sodium salt was 0.3% which was low as compared with the conventional methods.

EXAMPLE 7

Water (70 parts) and conc. sulfuric acid (20 parts) were added to a solution of trioctylamine (50 parts) in toluene (100 parts), and then sodium 1-hydroxy-2-(4-β-hydroxyethylsulfonyl)phenylazo-naphthalene-3-sulfonate (23 parts) was added thereto. Thereafter, the mixture was treated in the same manner as in Example 1 to obtain 28 parts of the orange sodium salt of the ester. The sodium sulfate content of the sodium salt was as little as 0.3%.

EXAMPLE 8

Water (80 parts) and conc. sulfuric acid (30 parts) were added to a solution of trioctylamine (85 parts) in toluene (200 parts), and then sodium 1-hydroxy-2-[2'-methoxy-4'-(3''-β-hydroxyethylsulfonyl)phenylazo-5'-methyl]phenylazo-naphthalene-3,6,8-trisulfonate (40 parts) was added thereto. The mixture was then brought, in the same manner as in Example 1, to the stage where an excess of the acid was removed. Thereafter, an aqueous solution of sodium hydrogen carbonate (16.8 parts) in water (150 parts) was added dropwise thereto at room temperature. After the addition was finished, the reaction mixture was stirred for 2 more hours, and allowed to stand to separate it into two layers. The separated lower layer was colored reddish violet and had a pH of 6.0. This layer was dried at 60° C. under reduced pressure to obtain 45 parts of the corresponding ester. The sodium sulfate content of the cake was 0.8%.

While, copper sulfate pentahydrate (13 parts) and crystalline sodium acetate (21 parts) were added to the foregoing lower layer before drying, and after adjusting the pH to 5.0, the mixture was heated to 90° to 98° C. for 8 hours. After cooling to 50° C., sodium chloride (30 parts) was added for salting-out, and the precipitated cake was filtered, washed with a 20% aqueous sodium chloride solution and dried at 60° C. The product thus obtained agreed with C.I. Reactive Blue 147.

EXAMPLE 9

Water (100 parts) and conc. sulfuric acid (8 parts) were added to a solution of dibenzyldodecylamine (40 parts) in toluene (200 parts), and then the sodium salt (52 parts) of 1-(4-β-hydroxyethylsulfonyl)phenyl-3-methyl-4-(2-sulfo-4-chloro)phenylazo-5-pyrazolone was added thereto, followed by stirring at 60° C. for 1 hour. On standing, the reaction mixture separated into two layers of which the lower layer was colorless. The two layers were separated from each other, and the lower layer was discarded. The upper layer was heated to 110° C. for dehydration, and then treated in the same manner as in Example 2 to obtain 60 parts of the yellow corresponding ester. The sodium sulfate content of the ester was as little as 0.5%.

EXAMPLE 10

Water (100 parts) and conc. sulfuric acid (8 parts) were added to a solution of N-benzyldodecylamine (35 parts) in tetrachloroethylene (250 parts), and then the sodium 1-amino-4-(3-β-hydroxyethylsulfonyl-4-methoxy)anilino-anthraquinone-2-sulfonate (60 parts) was added thereto, followed by stirring at 70° C. for 1 hour. On standing, the reaction mixture separated into two layers, of which the upper layer was colorless. The two layers were separated from each other, and the upper layer was discarded. The lower layer was heated to 121° C. for dehydration, and then treated in the same manner as in Example 2 to obtain 65 parts of the blue corresponding ester.

What is claimed is:

1. In a process for producing a compound having in the molecule at least one sulfonic acid group and at least one β-sulfatoethylsulfone group of the formula, —SO$_2$CH$_2$CH$_2$OSO$_3$M, wherein M is hydrogen or an alkali metal, which comprises reacting a starting compound having in the molecule at least one sulfonic acid group and at least one β-hydroxyethylsulfone group of the formula, —SO$_2$CH$_2$CH$_2$OH, with an esterifying agent selected from the group consisting of sulfuric acid, sulfamic acid and chlorosulfonic acid, the improvement comprising (1) conducting the reaction in the presence of a water-insoluble organic solvent and a secondary or tertiary amine represented by the formula,

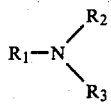

wherein $R_1$ is a $C_6$–$C_{24}$ aliphatic, aromatic or aralkyl group, and $R_2$ and $R_3$ are independently a hydrogen atom or a $C_1$–$C_{24}$ hydrocarbon group, provided that $R_2$ and $R_3$ are not hydrogen atoms at the same time; the starting compound being selected from the group consisting of azo dye compounds, anthraquinone dye compounds, naphthalene dye compounds, pyrazolone dye compounds, and phthalocyanine dye compounds, the amount of the esterifying agent being from 1 to 10 moles per β-hydroxyethylsulfone group of the starting compound, the amount of the amine being from 1 to 10 moles per mol of the starting compound, and the reaction being carried out at a temperature of from about 40° to about 180° C.;

(2) washing the resulting reaction mixture with water or a weakly alkaline aqueous solution to remove excess of the esterifying agent; and (3) subjecting the reaction mixture to extraction with a weakly alkaline aqueous solution, whereby an aqueous solution containing the dye is obtained.

2. The process according to claim 1, wherein the solvent is an aromatic or aliphatic hydrocarbon.

3. The process according to claim 1, wherein the starting compound is an anthraquinone dye compound.

4. The process according to claim 1, wherein the starting compound is selected from the group consisting of (1) 1-amino-4-(3-β-hydroxyethylsulfonyl) anilinoanthraquinone-2-sulfonic acid, (2) 1-hydroxy-2-[4-(β-hydroxyethylsulfonyl)-phenylazo]-naphthalene-3-sulfonic acid, (3) 1-hydroxy-2-[2-methoxy-4-[3-(β-hydroxyethylsulfonyl)phenylazo]-5-methyl]phenylazonaphthalene-3,6,8-trisulfonic acid, (4) 1-amino-2,7-bis[4-(β-hydroxyethylsulfonyl)-phenylazo]-8-hydroxy-naphthalene-3,6-disulfonic acid and (5) 1-[4-(β-hydroxyethylsulfonyl)phenyl]-3-methyl-4-(2-sulfo-4-chlorophenylazo)-5-pyrazolone.

5. The process according to claim 1, wherein the amine is a secondary amine selected from the group consisting of diheptylamine, dioctylamine, didecylamine, didodecylamine, ditetradecylamine, dihexadecylamine, dioctadecylamine, dibenzylamine, di-α-methylbenzylamine, di-2-ethylhexylamine, bis-(2-methylcyclohexylmethyl)amine, N-methyldodecylamine, N-(2-ethylhexyl)-2-pentylnonylamine, N-benzyldodecylamine, N-benzyltetradecylamine, N-α-methylbenzyl-2-ethylhexylamine, N-3-phenylpropyl-n-tetradecylamine, N-methyltetradecylamine and N-methyloctadecylamine.

6. The process according to claim 1, wherein the amine is a tertiary amine selected from the group consisting of trihexylamine, trioctylamine, tridecylamine, tridodecylamine, N-methyldioctylamine, N-methyldidecylamine, N-methyldidodecylamine, N-methyldioctadecylamine, N-methyldiethylhexylamine, N-dodecyldimethylamine, N-dodecyldiethylamine, N-dodecyldibutylamine, N-dodecyldihexylamine, N-dodecyldibenzylamine (dibenzyldodecylamine), N-benzyldidodecylamine, N-propyldidecylamine, N-butyldidodecylamine, N-tetradecyldibenzylamine, N-isooctyldibenzylamine, di(methylbenzyl)dodecylamine, dibenzyloctadecylamine, dibenzyloctylamine and dibenzyldecylamine.

7. The process according to claim 1, wherein the reaction is effected by (1) mixing the starting compound and the secondary or tertiary amine in a heterogeneous solution of water and the water-insoluble organic solvent in the presence or absence of an acid;

(2) separating the mixture into an aqueous layer and an organic layer;

(3) mixing the esterifying agent with the organic layer; and then (4) heating the organic layer mixed with the esterifying agent to a temperature of from 60° to 180° C.;

the amount of the amine being from 2 to 10 moles per mole of the starting compound and the amount of the esterifying agent being from 1 to 3 moles per β-hydroxyethylsulfone group of the starting compound.

8. The method according to claim 7, wherein amine is mixed both at steps (1) and (3).

9. The method according to claim 7, wherein the esterifying agent is sulfamic acid.

10. The method according to claim 1, wherein the reaction is effected by (1) mixing the starting compound, the secondary or tertiary amine and the esterifying agent in a heterogenous solution of water and the water-insoluble organic solvent;

(2) separating the mixture into an aqueous layer and an organic layer; and then (3) heating the organic layer to a temperature of 90° to 150° C.;

the amount of the amine being from 2 to 10 moles per mole of the starting compound and the amount of the esterifying agent being from 1 to 10 moles per β-hydroxyethylsulfone group of the starting compound.

11. The process according to claim 10, wherein the esterifying agent is sulfuric acid.

* * * * *